E. L. PFUNDER.
TYPE WRITING MACHINE.
APPLICATION FILED SEPT. 9, 1908.
938,507.
Patented Nov. 2, 1909.
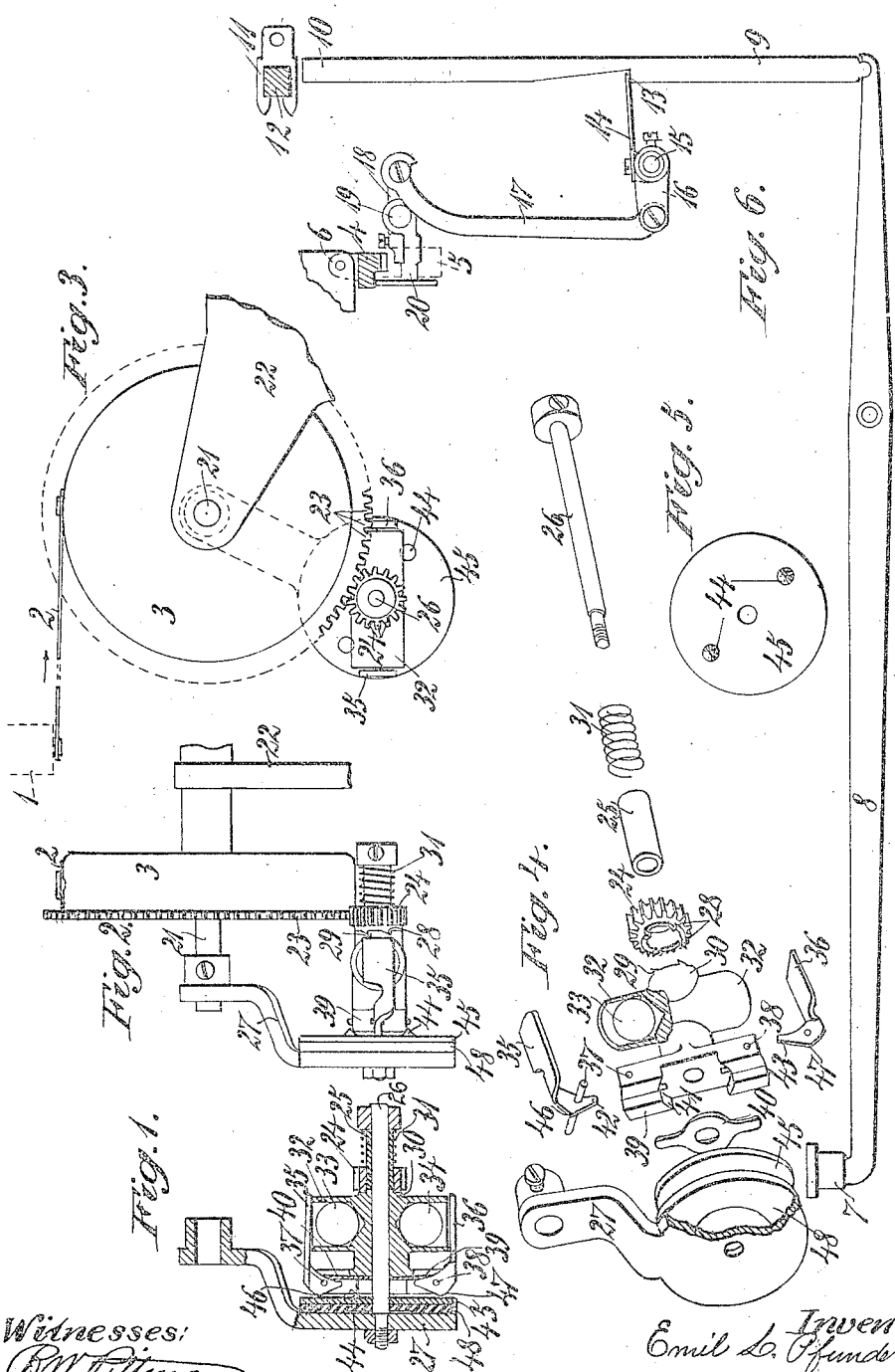
Witnesses:
R. W. Pittman
John C. Seifert
Inventor:
Emil L. Pfunder,
By his Attorney
D. C. Stickney.

UNITED STATES PATENT OFFICE.

EMIL L. PFUNDER, OF HARTFORD, CONNECTICUT, ASSIGNOR TO UNDERWOOD TYPEWRITER COMPANY, OF NEW YORK, N. Y., A CORPORATION OF NEW JERSEY.

TYPE-WRITING MACHINE.

938,507.  Specification of Letters Patent.  Patented Nov. 2, 1909.

Application filed September 9, 1908. Serial No. 452,300.

*To all whom it may concern:*

Be it known that I, EMIL L. PFUNDER, a citizen of the United States, residing in Hartford, in the county of Hartford and State of Connecticut, have invented certain new and useful Improvements in Type-Writing Machines, of which the following is a specification.

This invention relates to typewriting and tabulating machines, and particularly to means for braking or controlling the speed of the carriage when it is released from its letter-spacing devices.

The invention is in the nature of an improvement upon the construction shown in my Patent No. 903,765 granted November 10, 1908, in which a centrifugally-operated braking device is illustrated in connection with the carriage of a typewriter, to be operated when the carriage is released from its letter-spacing devices by means of a tabulator-key, thereby preventing the carriage from exceeding a predetermined limit of speed. In said application, a pinion connected to the braking mechanism is permanently in mesh with the driving gear connected to the carriage and revolves idly during the to and fro movements thereof, said gear being provided with a clutch normally disconnected from the centrifugal braking mechanism, but connected therewith when the carriage is released by the tabulator-key.

One of the objects of the present invention is to avoid the necessity of connecting the braking mechanism with the carriage-driving mechanism when released from its letter-feeding devices, and for this purpose the braking mechanism is permanently connected with the driving gear of the carriage, but is operable only when the carriage is advanced in letter-space direction.

I preferably mount the braking devices upon a spindle and also mount on said spindle a pinion permanently in mesh with a gear on the carriage-driving spring barrel, a ratchet or clutch device being provided to rotate the braking device only when the carriage moves in letter-space direction; the teeth of the pinion ratchet riding over the teeth of its co-acting ratchet, when the carriage is returned to begin a new line.

In the accompanying drawings, Figure 1 is a sectional side elevation of the braking mechanism. Fig. 2 is a side elevation of the braking mechanism shown in connection with the carriage-driving barrel. Fig. 3 is a rear elevation of the parts shown in Fig. 2. Fig. 4 is a perspective view of the component parts of the braking mechanism disassembled. Fig. 5 is an elevation of a metal friction disk, and Fig. 6 is a diagrammatic elevation of the tabulating mechanism, including the denomination stop key and means to release the carriage from the control of its letter-space feeding devices.

A paper carriage 1 is connected by a strap 2 to a spring barrel 3. Upon the carriage is a rack 4 to engage a pinion 5 forming part of the escapement mechanism, to control the letter-feeding movements of the carriage. The rack is hinged at 6 upon the carriage to be released from said pinion to permit the carriage to advance rapidly.

A denomination key 7 is mounted upon a lever 8, which thrusts upward a rod 9 having at its upper end a stop 10, to coöperate with a column stop 11, which is mounted upon a rack bar 12 fixed upon the framework. The rod 9 is formed with a shoulder 12 and engages a universal bar 14, which is fixed upon and projects back from a rock-shaft 15, said rock-shaft also carrying a forwardly extending arm 16, which is connected by a link 17 to a lever 18 pivoted at 19 upon the framework and carrying a roll 20 to release the rack 4 from the pinion 5 when the key 7 is depressed. As so far described, the parts are in common use upon the Underwood typewriting machine.

The spring barrel 3 is journaled upon a stud 21 supported in the framework 22. Permanently meshing with a gear 23 on said spring barrel is a pinion 24, which rotates the braking mechanism, the pinion and the braking mechanism being both mounted on a fixed stud 26. The latter is secured in a bracket 27, which depends from the outer end of the barrel-supporting stud 21. The pinion 24 is provided with a ratchet or clutch member 28, and is caused to engage a complementary ratchet or clutch member 29, provided on the outer end of a governor head 30, by means of a compression spring 31, which is coiled about a spacer sleeve or bushing 25, and on which the pinion 24 is fitted.

The governor head 30 is provided with a pair of oppositely-extending arms 32 open or tubular at their outer ends and carrying metal balls or weights 33, 34. Opposite levers 35, 36 are pivoted at 37, 38 in the slitted ends of a cross-arm 39 at the inner end of the governor head 30, one arm of each lever extending up in front of an open end of the tubular arms 32, to be engaged by a ball, said arms being under the influence of a spring 40 mounted on the stud 26 and fitting in a recess 41 in the cross-arm 39, and said spring catching under ears 42, 43 on said levers.

During the letter-feeding movements of the carriage the braking mechanism has little or no effect, since such movements are very short; but when the carriage is released from its letter-spacing devices by the tabulator key 7 or otherwise, and a rapid movement imparted thereto by the spring barrel, the pinion 26 revolves the governor head rapidly, the cross-arm 39 engaging pointed pins 44 on a metal disk 45, to rotate the latter and force it against friction disk 48 with some force. Moreover, by the action of centrifugal force, the heavy balls 33, 34 are thrown outwardly against the lever-arms 35, 36, forcing them away from the arms 32, and causing cam shoulders 46, 47 provided on the lever arms 35, 36, to press against the surface of the disk 45, forcing it against the fiber disk 48, thereby creating friction and reducing or controlling the speed of the carriage 1.

When the carriage is returned to begin a new line, the teeth of the ratchet or clutch member 28 on the pinion 24 ride idly over the teeth of the coacting clutch member 29 on the governor head.

Having thus described my invention, I claim:

1. In a typewriting machine, the combination with a carriage, carriage feeding devices, and releasing means, of a centrifugally governed braking device permanently connected to the carriage, but effective to retard the carriage appreciably only when the carriage is released from its feeding devices and rapidly advanced in letter space direction.

2. In a typewriting machine, the combination with a carriage having a releasable rack, carriage feeding devices, and a spring barrel connected to the carriage and having a gear, of a pinion permanently in mesh with said gear and provided with a clutch member, a rotary braking device also having a clutch member, and a spring tensioned to normally couple said clutch members to operate the braking device when the carriage rack is released from the carriage feeding devices and the carriage rapidly advanced in letter space direction.

3. In a typewriting and tabulating mechanism, the combination with a carriage, carriage feeding devices, and a tabulator key having means to release the carriage, of a pinion permanently connected to the carriage to rotate during the to and fro movements of the latter, and provided with a clutch member, a rotary braking device also provided with a clutch member, and a spring tensioned to normally couple the clutch members to operate the braking mechanism when the carriage is fed in letter space direction.

4. In a typewriting and tabulating mechanism, the combination with a carriage having a rack, carriage feeding devices, and a key having means to release the carriage rack, of a pinion permanently connected to the carriage to rotate during the to and fro movements of the latter and provided with a clutch member, a rotary braking device also provided with a clutch member, a spring tensioned to normally couple the clutch members to operate the braking device when the carriage is fed in letter space direction, but the braking device remaining idle when the carriage is returned to begin a new line.

5. In a typewriting and tabulating mechanism provided with a carriage, carriage feeding devices, and a tabulator key having means to release the carriage, the combination of a pinion permanently connected to the carriage and provided with a toothed clutch member, a centrifugal-governing and frictional-braking device also provided with a toothed clutch member, and a spring tensioned to always couple the clutch members to operate the governing and braking device when the carriage is fed in letter space direction, the teeth of the pinion clutch member riding over the teeth of the other clutch member, and the braking device remaining idle, when the carriage is returned to begin a new line.

6. In a typewriting and tabulating mechanism provided with a carriage, carriage feeding devices, and a tabulator key having means to release the carriage, the combination with a spring barrel connected to the carriage and having a gear, of a pinion permanently in mesh with said gear and provided with a toothed clutch member, a rotary braking device also provided with a toothed clutch member, and a spring tensioned to normally couple the clutch members to operate the braking device when the carriage is rapidly advanced in letter-space direction.

7. A rotary braking device permanently connected to the spring barrel of the carriage of a typewriting machine, comprising a governor head having at one end oppositely-extending arms open at their outer ends, metal balls within said arms, a pair of levers pivoted near the other end of said governor head, one arm of each lever extending up in front of an open end of the tubular arms, a spring normally holding the arms in such positions, a disk provided with pointed pins to be engaged by the governor head and rotated therewith, a friction disk, and cam shoulders provided on the levers to bear against the surface of the first disk and press it against the friction disk.

8. A rotary braking device permanently connected to the spring barrel of the carriage of a typewriting machine, comprising a governor head having at one end oppositely-extending arms open at their outer ends, metal balls within said arms, a pair of levers pivoted near the other end of said governor head, one arm of each lever extending up in front of an open end of the tubular arms, a spring for normally holding the arms in such positions, a disk provided with pointed pins to be engaged by the governor head and rotated therewith, a friction disk, and cam shoulders provided on the levers to bear against the surface of the first disk; said braking device mounted on a spindle secured in a bracket supported by and depending from the projecting end of the barrel-supporting stud.

9. A rotary braking device permanently connected to the spring barrel of the carriage of a typewriting machine, comprising a governor head having a pair of arms, metal balls in recesses in said arms, a pair of pivoted levers, one arm of each lever extending up in front of an open end of the arms, a spring to normally hold the arms in such positions and to retain the balls within said recesses, a disk rotatable with the governor head, a friction disk, and cam shoulders provided on the levers; the centrifugal action, when the governor head is rotated at a high velocity, throwing the balls outwardly against the lever arms, rocking the levers and causing the cam shoulders to ride upon the surface of the first disk pressing it against the friction disk.

10. In a typewriting and tabulating mechanism provided with a carriage, carriage feeding devices, and a key having means to release the carriage, the combination with a spring barrel connected to the carriage and having a gear, of a pinion permanently in mesh with said gear and provided with a clutch member, a governor head having a clutch member at its outer end, a spring tensioned to normally couple such clutch members, oppositely-extending arms having open ends near the outer end of said governor head, balls within said arms, oppositely-extending arms at the inner end of said governor head, said arms having slitted ends, levers pivotally supported in the slits of said arms, an arm of each lever extending up in front of an open end of a tubular arm, a spring catching under fingers provided on the levers to hold the lever arms over the openings in the tubular arms to retain the balls therein, a disk provided with pins engaged by the governor head to rotate the disk, a friction disk, and cam shoulders formed on the levers and bearing against the surface of the first disk; said pinion and braking device rotatably mounted on a spindle secured in a bracket depending from the projecting end of the barrel stud.

11. In a typewriting and tabulating mechanism provided with a carriage, carriage feeding devices, and a key having means to release the carriage, the combination with a spring barrel connected to the carriage and having a gear, of a pinion permanently in mesh with said gear and provided with a clutch member, a governor head having a clutch member at its outer end, a spring tensioned to normally couple such clutch members, oppositely-extending arms having open ends near the outer end of said governor head, balls within said arms, oppositely-extending arms at the inner end of said governor head, said arms having slitted ends, levers pivotally supported in the slits of said arms, an arm of each lever extending up in front of an open end of a tubular arm, a spring catching under fingers formed on the levers to hold the lever arms over the openings in the tubular arms to retain the balls therein, a disk provided with pins engaged by the governor head to rotate the disk, a friction disk, and cam shoulders formed on the levers, said pinion and braking device rotatably mounted on a spindle secured in a bracket supported by and depending from the projecting end of the barrel stud; and the centrifugal action of the governor when the carriage is rapidly advanced in letter space direction throwing the balls outwardly against the lever arms, rocking said arms and causing the cam shoulders to ride upon the surface of the first disk and press it against the friction disk, creating sufficient friction to retard the speed of the governor and spring barrel and thereby reducing or controlling the speed of the carriage.

12. In a typewriting and tabulating mechanism, the combination with a carriage, carriage feeding devices, and a key having means to release the carriage, of a spring barrel connected to the carriage and having a gear, a pinion permanently in mesh with said gear and provided with a clutch member, a stud mounted in a bracket depending from the projecting end of the barrel-supporting stud, a bushing on said spindle on which the pinion is journaled, a governor head having a clutch member, a spring coiled about the bushing and tensioned to couple the clutch members, hollow arms having open outer ends, metal balls within said hollow arms, cross arms, the outer ends of which arms are slitted, levers pivotally supported in the slits of said arms, one arm of each lever extending up in front of an open end of the hollow arms, a spring catching under fingers provided on said levers to normally hold the lever arms over the openings in the hollow arms and retain the balls therein, a disk rotatable with the governor head, and a friction disk; the levers provided with shoulders which bear against the first disk and press it against the friction disk to retard the speed of the carriage when it is released from its feed devices.

13. In a typewriting and tabulating mechanism, the combination with a spring-driven carriage, of a braking mechanism connected thereto to be operated whenever the carriage moves in letter feeding direction; a pawl or clutch mechanism being provided between the braking mechanism and the carriage, to permit the latter to run back without opposition from the braking mechanism.

EMIL L. PFUNDER.

Witnesses:
W. M. KYOREMAN,
LYMAN D. BROUGHTON.